(12) United States Patent
Rehle

(10) Patent No.: US 9,523,455 B2
(45) Date of Patent: Dec. 20, 2016

(54) COMPENSATOR OF AN EXHAUST GAS AFTERTREATMENT SYSTEM

(71) Applicant: Stefan Rehle, Türkheim (DE)

(72) Inventor: Stefan Rehle, Türkheim (DE)

(73) Assignee: MAN Diesel & Turbo SE, Augsburg (DE)

(*) Notice: Subject to any disclaimer, the term of this patent is extended or adjusted under 35 U.S.C. 154(b) by 0 days.

(21) Appl. No.: 14/100,835

(22) Filed: Dec. 9, 2013

(65) Prior Publication Data

US 2014/0166142 A1    Jun. 19, 2014

(30) Foreign Application Priority Data

Dec. 11, 2012 (DE) .......................... 10 2012 024 118

(51) Int. Cl.
  *F01N 1/00* (2006.01)
  *F16L 55/04* (2006.01)
  *F16L 51/02* (2006.01)

(52) U.S. Cl.
  CPC .................................... *F16L 51/025* (2013.01)

(58) Field of Classification Search
  CPC ..... F01N 3/0211; F01N 13/1816; F16L 11/00; F16L 51/025
  USPC ................................ 60/324; 138/26; 422/179
  See application file for complete search history.

(56) References Cited

U.S. PATENT DOCUMENTS

| 7,941,995 | B2 | 5/2011 | Goss et al. |
| 8,261,538 | B2 | 9/2012 | Kistner et al. |
| 2006/0013746 | A1 | 1/2006 | Bien et al. |
| 2010/0083646 | A1* | 4/2010 | Poppe ............................ 60/311 |

FOREIGN PATENT DOCUMENTS

| DE | 10 2004 018 693 A1 | 11/2005 |
| DE | 10 2004 020 138 A1 | 11/2005 |
| DE | 2008 010 071 A1 | 8/2009 |
| DE | 11 2008 002 531 T5 | 9/2010 |
| DE | 10 2010 035 311 A1 | 1/2012 |
| DE | 10 2012 208 072 A1 | 11/2012 |

* cited by examiner

*Primary Examiner* — Audrey K Bradley
*Assistant Examiner* — Jason Sheppard
(74) *Attorney, Agent, or Firm* — Cozen O'Connor

(57) ABSTRACT

A compensator (10) of an exhaust gas aftertreatment system has a flow inlet-side connection flange (13) for connecting a flow inlet-side assembly (11), a flow outlet-side connection flange (14) for connecting a flow outlet-side assembly (12), a connection pipe (18) which extends between the two connection flanges (13, 14) and which has a bellows-shaped pipe portion (19), and an exhaust gas aftertreatment assembly (21) extending inside the connection pipe (18). The exhaust gas aftertreatment assembly (21) protrudes relative to the flow inlet-side connection flange (13) and/or relative to the flow outlet-side connection flange (14) such that it extends into the flow inlet-side connection assembly (11) and/or into the flow outlet-side assembly (12).

8 Claims, 2 Drawing Sheets

COMPENSATOR OF AN EXHAUST GAS AFTERTREATMENT SYSTEM

BACKGROUND OF THE INVENTION

1. Field of the Invention

The invention relates to a is directed to a compensator of an exhaust gas aftertreatment system having a flow inlet-side connection flange for connecting a flow inlet-side assembly, a flow outlet-side connection flange for connecting a flow outlet-side assembly, a connection pipe which extends between the two connection flanges and which has a bellows-shaped pipe portion, and an exhaust gas aftertreatment assembly extending inside the connection pipe.

2. Description of the Related Art

A compensator of an exhaust gas aftertreatment system having two flanges, namely a flange on the flow inlet side and a flange on the flow outlet side, is known from DE 10 2008 010 071 A1. A flow inlet-side assembly can be connected to the flow inlet-side flange and a flow outlet-side assembly can be connected to the flow outlet-side flange. A connection pipe with a bellows-shaped pipe portion, particularly a bellows-shaped corrugated pipe portion, extends between these two flanges. It is further known from DE 10 2008 010 071 A1 that an exhaust gas aftertreatment assembly, namely a catalytic converter, is integrated in the compensator of an exhaust gas aftertreatment system such that the catalytic converter extends inside the connection pipe of the compensator. The exhaust gas aftertreatment assembly, namely the catalytic converter, can be detached and removed from the compensator. There is a demand for an exhaust gas aftertreatment system with greater flexibility compared to the compensator known in the prior art.

SUMMARY OF THE INVENTION

Based on this, it is an object of the invention to provide a compensator of an exhaust gas aftertreatment system.

This object is achieved, according to a first aspect of the invention, by a compensator having an exhaust gas aftertreatment assembly that protrudes relative to a flow inlet-side connection flange and/or relative to a flow outlet-side connection flange such that it extends into a flow inlet-side connection assembly and/or into a flow outlet-side assembly.

According to the first aspect, the exhaust gas aftertreatment assembly protrudes relative to the flow inlet-side connection flange and/or relative to the flow outlet-side connection flange, that is, in such a way that the exhaust gas aftertreatment assembly extends into the flow inlet-side assembly mounted at the flow inlet-side connection flange and/or into the flow outlet-side assembly mounted at the flow outlet-side connection flange. In this way, the flexibility of an exhaust gas aftertreatment system can be increased.

The above-stated object is also met according to a second aspect of the invention by a compensator having an exhaust gas aftertreatment assembly that has a smaller cross section than the connection pipe such that a first portion of the exhaust gas flow to be guided via the compensator flows through the exhaust gas aftertreatment assembly, whereas a second portion of the exhaust gas flow to be guided via the compensator flows past the exhaust gas aftertreatment assembly.

According to the second aspect, which is preferably used in conjunction with the first aspect, the flow cross sections of the connection pipe of the compensator and exhaust gas aftertreatment assembly differ such that only as portion of the exhaust gas to be guided via the compensator flows through the exhaust gas aftertreatment assembly. The flexibility of an exhaust gas aftertreatment system can also be increased in this way.

The exhaust gas aftertreatment assembly is preferably positioned in the connection pipe in such a way that a longitudinal axis of the exhaust gas aftertreatment assembly and a longitudinal axis of the connection pipe are offset preferably parallel to one another. This makes it possible to position the exhaust gas aftertreatment assembly in a region of the connection pipe which is particularly favorable with respect to flow.

According to an advantageous further aspect of the invention, the second portion of the exhaust gas flow to be guided via the compensator flows through a second exhaust gas aftertreatment assembly that is connected parallel to the exhaust gas aftertreatment assembly. This makes it possible to integrate a plurality of exhaust gas aftertreatment assemblies in the compensator and, in this way, to further increase the flexibility of the exhaust gas aftertreatment system.

The exhaust gas aftertreatment assembly and the connection pipe preferably have flow cross sections with geometrically different outer contours. In this case, the connection pipe preferably has a circular flow cross section and the exhaust gas aftertreatment system has a divergent, e.g., oval, flow cross section. In this way, it is possible to adapt the flow cross section of the exhaust gas aftertreatment assembly to flow conditions in the connection pipe in an optimal manner.

According to an advantageous further aspect of the invention, the cross section of the exhaust gas aftertreatment assembly is between 30% and 70% of the cross section of the connection pipe. In this case, there is a cross-sectional area that is sufficiently large so that, in addition to the exhaust gas aftertreatment assembly, a further assembly can be integrated in the compensator parallel to the exhaust gas aftertreatment assembly.

Preferred further aspect of the invention are indicated and the following description.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Exemplary embodiment of the invention are described more fully with reference to the drawings without the invention being limited to these embodiment examples.

In the drawings.

DETAILED DESCRIPTION OF THE PRESENTLY PREFERRED EMBODIMENTS

The invention is directed to a compensator of an exhaust gas aftertreatment system and to an exhaust gas aftertreatment system with a compensator of this kind.

Figure 1A:
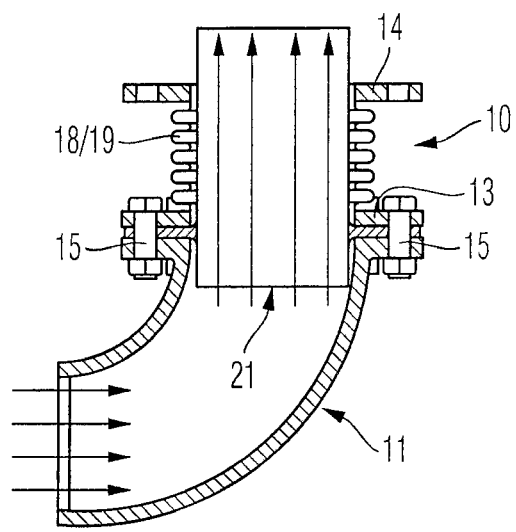
FIG. 1A is a cross section through a compensator of an exhaust gas aftertreatment system together with an adjoining assembly of the exhaust gas aftertreatment system according to a first embodiment.
Figure 1B:
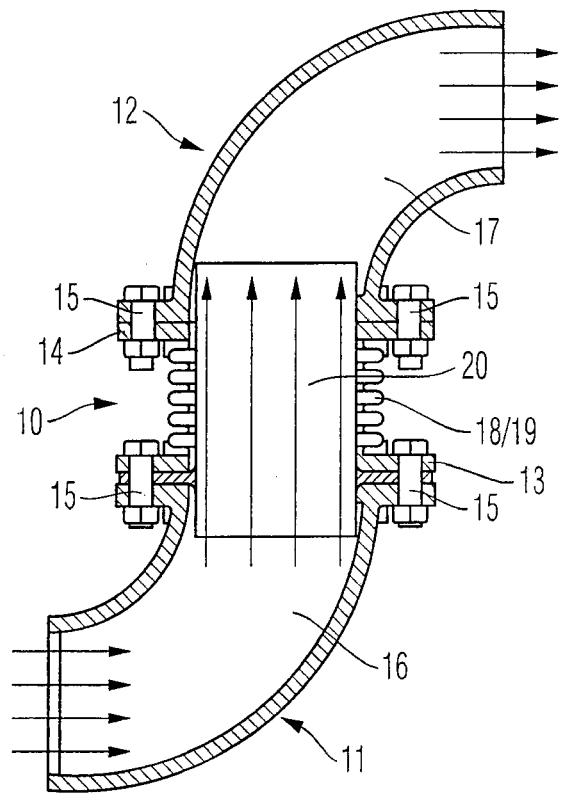
FIG. 1B shows the compensator of FIG. 1A together with two adjoining assemblies of the exhaust gas aftertreatment system.

FIGS. 1A and 1B show a first exemplary embodiment of a compensator 10. In FIG. 1A the compensator 10 is shown together with a flow inlet-side assembly 11, and in FIG. 1B the compensator 10 is shown together additionally with a flow outlet-side assembly 12. The compensator 10 has a flow inlet-side connection flange 13 and a flow outlet-side connection flange 14. The flow inlet-side assembly 11 of the exhaust gas aftertreatment system can be connected or is connected to compensator 10 at the flow inlet-side connection flange 13, and the flow outlet-side assembly 12 of the exhaust gas aftertreatment system can be connected or is connected to the compensator 10 at the flow outlet-side connection flange 14, namely via screw connections 15 in the illustrated embodiment example.

In the illustrated exemplary embodiment, the flow inlet-side assembly 11 and the flow outlet-side assembly 12, which are connected to the compensator 10, are curved exhaust gas guide pipes such that the flow inlet-side assembly 11 and flow outlet-side assembly 12 provide curved flow channels 16 and 17, respectively. Extending between the two connection flanges 13 and 14 of the compensator 10 is a connection pipe 18 thereof which has a bellows-shaped pipe portion 19 which extends continuously between the two connection flanges 13 and 14 in the exemplary illustrated embodiment. The connection pipe 18 of the compensator 10 provides a flow channel 20 for exhaust gas that communicates with the flow channels 16 and 17 of the two assemblies 11 and 12 and that is connected therebetween. An exhaust gas aftertreatment assembly 21 is integrated in the compensator 10 in such a way that it extends inside the connection pipe 18 of the compensator 10.

According to a first aspect of the present invention, the exhaust gas aftertreatment assembly 21 which is integrated in the compensator 10 protrudes relative to the flow inlet-side connection flange 13 and/or relative to the flow outlet-side connection flange 14 in such a way that the exhaust gas aftertreatment assembly 21 extends into the flow inlet-side assembly 11 and/or into the flow outlet-side assembly 12, i.e., in the embodiment of FIGS. 1A and 1B, it extends into the two exhaust gas chambers that are connected to the compensator. In an especially preferred embodiment of the invention, the exhaust gas aftertreatment assembly 21 protrudes on both sides relative to the connection pipe 18 and the connection flanges 13, 14 of the compensator 10, i.e., relative to both the flow inlet-side connection flange 13 and the flow outlet-side connection flange 14, so that the exhaust gas aftertreatment assembly 21 extends into the flow inlet-side assembly 11 and into the flow outlet-side assembly 12.

Figure 2A:
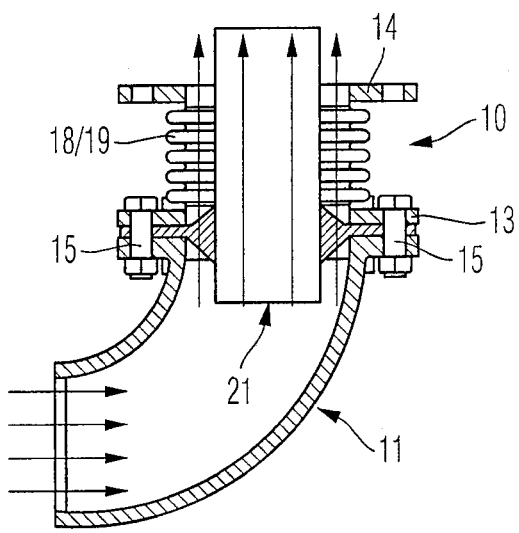
FIG. 2A is a cross section through a compensator of an exhaust gas aftertreatment system together with an adjoining assembly of the exhaust gas aftertreatment system according to a second embodiment.
Figure 2B:
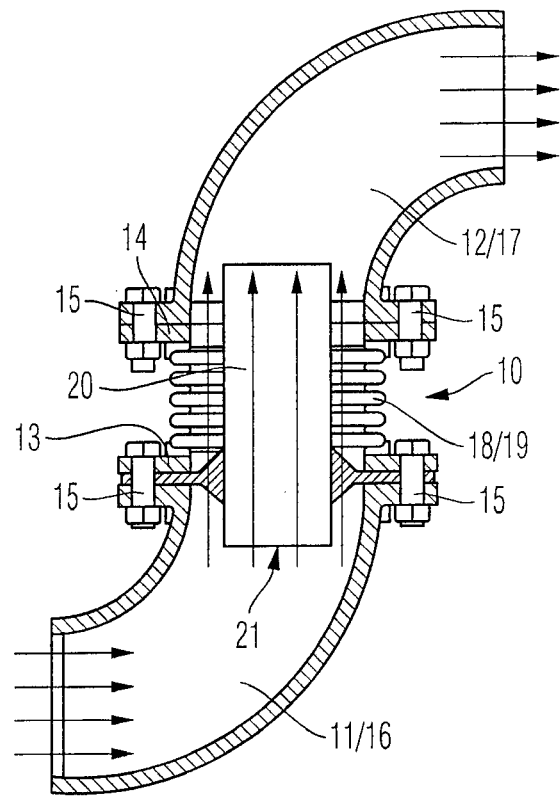
FIG. 2B shows the compensator of FIG. 2A together with two adjoining assemblies of the exhaust gas aftertreatment system.

FIGS. 2A and 2B show a second exemplary embodiment of compensator 10, which, in the illustrated embodiment, also comprises the features of the compensator 10 according to the first aspect of the present invention, shown in FIGS. 1A and 1B, i.e., which protrudes relative to the flow inlet-side connection flange 13 and/or the flow outlet-side connection flange 14 such that the exhaust gas aftertreatment assembly 21 positioned in the connection pipe 18 of the compensator 10 extends into the flow inlet-side assembly 11 and/or into the flow outlet-side assembly 12.

In the second embodiment of the compensator 10 shown in FIGS. 2A and 2B, the exhaust gas aftertreatment assembly 21, which is integrated in the compensator 10, has a smaller cross section than the connection pipe 18 of the compensator 10, namely such that a first portion of the exhaust gas flow to be guided via the compensator 10 flows through the exhaust gas aftertreatment assembly 21, whereas a second portion of the exhaust gas flow to be guided via the compensator 10 flows past the exhaust gas aftertreatment assembly 21. The flow cross section of the exhaust gas aftertreatment assembly 21 amounts to between 30% and 70%, particularly between 40% and 60%, of the cross section of the connection pipe 18 of the compensator 10.

In the second embodiment illustrated in FIGS. 2A, 2B, the exhaust gas aftertreatment assembly 21 is positioned coaxially in the connection pipe 18 so that, as a result, longitudinal axes of the exhaust gas aftertreatment assembly 21 and of the connection pipe 18 extending in the flow direction of the exhaust gas coincide with one another or lie on top of one another. It is also advantageously possible that the exhaust gas aftertreatment assembly 21 is positioned in the connection pipe 18 of the compensator 10 such that a longitudinal axis of the exhaust gas aftertreatment assembly 21 extends so as to be offset relative to a longitudinal axis of the connection pipe 18. This makes it possible to position the exhaust gas aftertreatment assembly 21 in a region of the connection pipe 18, which is particularly favorable with respect to flow.

In the second embodiment shown in FIGS. 2A and 2B, the portion of the exhaust gas flow that does not flow through the exhaust gas aftertreatment assembly 21 is purely a bypass flow which accordingly flows through the connection pipe 18 of the compensator 10 without being guided via another exhaust gas aftertreatment assembly. It is also advantageously possible that the second portion of the exhaust gas flow that is to be guided via the compensator 10 and that flows past the exhaust gas aftertreatment assembly 21 flows through a second exhaust gas aftertreatment assembly, which is connected in parallel to the exhaust gas aftertreatment assembly 21, so that two exhaust gas aftertreatment assemblies that are arranged in parallel are then integrated in the compensator 10, namely in the connection pipe 18 thereof.

The exhaust gas aftertreatment assembly 21 shown in FIGS. 1A to 2B is preferably a hydrolysis catalyst unit cooperating with a SCR catalytic converter, not shown. It is also advantageously possible to integrate a different catalytic converter in the compensator 10. It is likewise possible to integrate a particulate filter, e.g., a soot filter, in the compensator. Further, a catalytic converter and a particulate filter can be integrated in the compensator in series connection and in parallel connection.

The connection pipe 18 of the compensator 10 of the exhaust gas aftertreatment assembly 21 typically has flow cross sections with geometrically identical outer contours, i.e., the two flow cross sections are circular preferably regardless of their size. In contrast, it is also advantageously possible that the flow cross sections have geometrically different outer contours. Thus it is possible, for example, that the connection pipe 18 of the compensator 10 has a circular flow cross section and the exhaust gas aftertreatment assembly 21 has an oval or rectangular flow cross section. Accordingly, it is possible to adapt the flow cross section of the exhaust gas aftertreatment assembly 21 to flow conditions in the connection pipe 18 in an optimal manner.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A compensator (10) of an exhaust gas aftertreatment system, comprising:
   a flow inlet-side connection flange (13) configured to connect to a flow inlet-side assembly (11);
   a flow outlet-side connection flange (14) configured to connect to a flow outlet-side assembly (12);
   a connection pipe (18), which extends between the flow inlet-side connection flange (13) and the flow outlet-side connection flange (14), and which has a bellows-shaped pipe portion (19); and
   an exhaust gas aftertreatment assembly (21) extending inside the connection pipe (18),
   wherein the exhaust gas aftertreatment assembly (21) has a smaller cross section than the connection pipe (18) such that a first portion of the exhaust gas flow guided via the compensator (10) flows through the exhaust gas aftertreatment assembly (21), and a second portion of the exhaust gas flow guided via the compensator (10) flows past the exhaust gas aftertreatment assembly (21),
   wherein the cross section of the exhaust gas aftertreatment assembly (21) is between 30% and 70% of the cross section of the connection pipe (18), and
   wherein the second portion of the exhaust gas flow is purely an untreated bypass flow into the flow outside-side assembly (12).

2. The compensator according to claim 1, wherein the cross section of the exhaust gas aftertreatment assembly (21) is between 40% and 60% of the cross section of the connection pipe (18).

3. The compensator according to claim 1, wherein the exhaust gas aftertreatment assembly (21) is positioned coaxially in the connection pipe (18).

4. The compensator according to claim 1, wherein the exhaust gas aftertreatment assembly (21) and the connection pipe (18) have flow cross sections with geometrically different outer contours.

5. An exhaust gas aftertreatment system, comprising:
   a flow inlet-side assembly (11);
   a flow outlet-side assembly (12); and
   a compensator (10), the compensator including:
      a flow inlet-side connection flange (13) configured to connect to the flow inlet-side assembly (11);
      a flow outlet-side connection flange (14) configured to connect to the flow outlet-side assembly (12);
      a connection pipe (18), which extends between the flow inlet-side connection flange (13) and the flow outlet-side connection flange (14), and which has a bellows-shaped pipe portion (19); and
      an exhaust gas aftertreatment assembly (21) extending inside the connection pipe (18),
   wherein the exhaust gas aftertreatment assembly (21) is arranged such that it extends into at least one selected from the group consisting of:
      the flow inlet-side assembly (11), and
      the flow outlet-side assembly (12),
   wherein the exhaust gas aftertreatment assembly (21) has a smaller cross section than the connection pipe (18) such that a first portion of the exhaust gas flow guided via the compensator (10) flows through the exhaust gas aftertreatment assembly (21), and a second portion of the exhaust gas flow guided via the compensator (10) flows past the exhaust gas aftertreatment assembly (21),
   wherein the cross section of the exhaust gas aftertreatment assembly (21) is between 30% and 70% of the cross section of the connection pipe (18), and
   wherein the second portion of the exhaust gas flow is purely an untreated bypass flow into the flow outside-side assembly (12).

6. The exhaust gas aftertreatment system according to claim 5, wherein the cross section of the exhaust gas aftertreatment assembly (21) is between 40% and 60% of the cross section of the connection pipe (18).

7. The exhaust gas aftertreatment system according to claim 5, wherein the exhaust gas aftertreatment assembly (21) is positioned coaxially in the connection pipe (18).

8. The exhaust gas aftertreatment system according to claim 5, wherein the exhaust gas aftertreatment assembly (21) and the connection pipe (18) have flow cross sections with geometrically different outer contours.

* * * * *